United States Patent Office 3,367,438
Patented Feb. 6, 1968

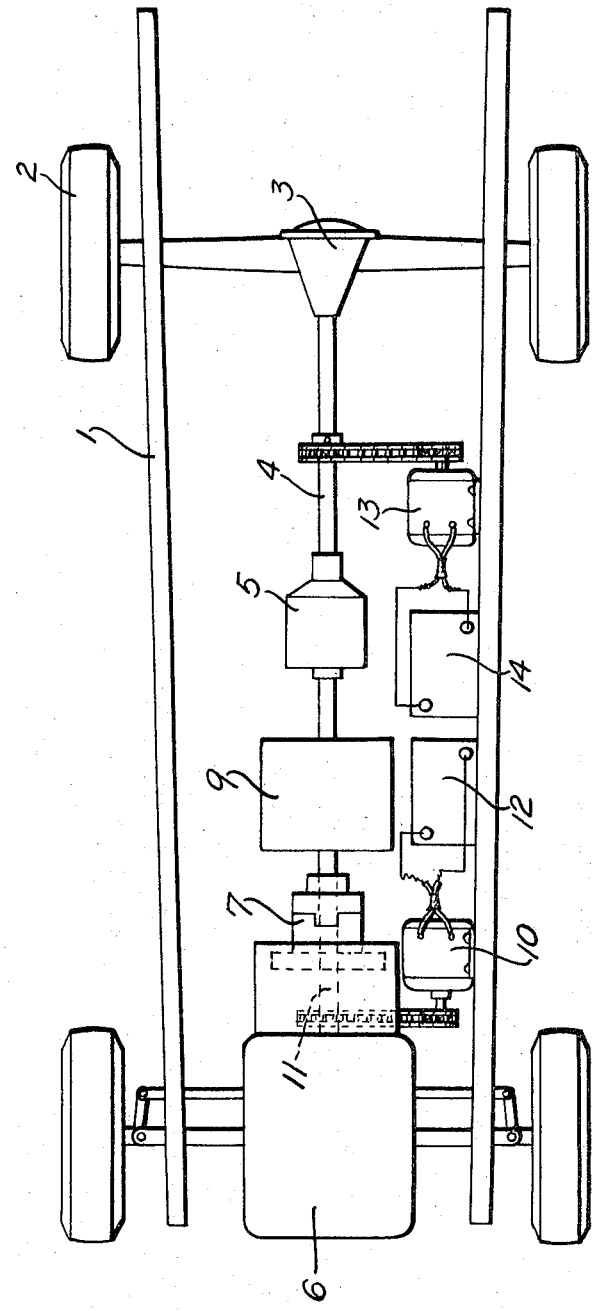

3,367,438
MOTOR VEHICLE DRIVES
David Pelton Moore, Marlow, N.H.
(9210 Flower Ave., Silver Spring, Md. 20901)
Filed Apr. 19, 1967, Ser. No. 632,078
3 Claims. (Cl. 180—65)

ABSTRACT OF THE DISCLOSURE

This motor vehicle drive consists of an automobile chassis equipped with two motors, one a normal internal combustion engine and the second an electric motor, the former when idling or driving operates an electric generator to charge the battery for the electric motor, there being a supplemental generator connected to the drive shaft to act as a supplemental charging means for the battery during the driving of the automobile, the internal combustion engine being disengaged from the electric motor when the motor is driving the vehicle.

---

My present invention relates to improvements in motor vehicle drives, one object of the invention being the combination of an internal combustion driving power for use in moving the vehicle in the country and an electric motor drive for use in such districts where air pollution is prohibited.

Another object of the invention is to provide a battery charging generator operable irrespective of the driving of the motor vehicle by the internal combustion engine.

It is, therefore, the intention of the present invention to have a selective motor control, the internal combustion engine being operated as is normal in automobiles, while it also operates a generator when driving or idling to charge the battery for the electric motor which is used only to drive the automobile in restricted areas.

In order that the invention may be fully understood, attention is invited to the accompanying drawing, in which a top plan view in diagram is shown of the complete invention.

In the drawing, the numeral 1 designates the chassis, which is of normal or usual constriction, and 2 designates the drive wheel, which may be the rear or the front wheels. The differential 3 is driven by the main drive shaft 4, which, at the end opposite to the differential, is a change gear 5.

An internal combustion engine 6, of the usual type having four to six cylinders, carries the combined flywheel and clutch 7, which, in turn, is connected to the short driven shaft 8, which carries the armature of the electric motor 9.

An electric generator 10 is carried by the chassis, and is driven at 11 from the short driven shaft, so that it is operated to store current in the battery 12, at all times when the engine is driving the vehicle or idling, and also when the electric motor is used.

To provide supplemental electric current, a supplemental generator 13 is driven by the drive shaft 4, to supply the supplemental battery 14, and through the drive 15.

The usual starting switch, not shown, for the engine with its radiator, fan, and starting means is employed, while for the control of the electric motor, a rheostat switch (not shown) is provided as is common practice in starting and controlling electric motor use.

From the foregoing description taken in connection with the drawing, it will be seen that with this arrangement, or combination of elements a dual drive for motor vehicles is provided, and one that will permit the use of the vehicle in non-protected zones as in the suburbs and country, and that the batteries are charged when using the engine, so that current for the electric motor is at all times provided, to permit the vehicle to be propelled by the electric motor in zones where air pollution is not permitted.

Due to the clutch disposition, the internal combustion engine may be operated while the motor vehicle is being motor driven thus continuing to charge the battery and tending to obviate the necessity for the independent charging thereof.

What I claim as new is:
1. A motor vehicle comprising:
   a chassis including ground engaging wheels;
   a drive shaft connected to drive at least one of said wheels;
   a gear change mechanism connected to said drive shaft;
   an input shaft connected to said gear change mechanism;
   means for driving said input shaft including both an internal combustion engine and an electric motor;
   clutch means for selectively disengaging said internal combustion engine to allow said vehicle to be driven solely by said electric motor;
   a generator drivingly connected directly to said internal combustion engine independently of the electric motor;
   storage battery means electrically connected to the output of said generator; and
   means connecting said electric motor to be driven from said storage battery means.
2. The motor vehicle as defined in claim 1 together with a generator drivingly connected to the drive shaft;
   storage battery means connected to the output of said generator; and
   means for energizing said electric motor from said storage battery means.
3. The motor vehicle as defined in claim 1 wherein the driving wheels are rear wheels and the internal combustion engine is located at the front of the vehicle, with the clutch, the electric motor, and the gear change unit connected sequentially in the order named from the internal combustion engine to the rear wheels.

References Cited

UNITED STATES PATENTS

| | | | |
|---|---|---|---|
| 1,323,500 | 12/1919 | Stephenson | 180—65 |
| 3,205,965 | 9/1965 | Roth | 180—65 |
| 3,211,249 | 10/1965 | Papst | 180—65 |

BENJAMIN HERSH, *Primary Examiner.*

MILTON L. SMITH, *Examiner.*